3,036,112
BIS(CYANOALKYL) PHENYLENEDICARBAMATES
John W. Lynn, Charleston, W. Va., assignor to Union Carbide Corporation, a corporation of New York
No Drawing. Filed Sept. 15, 1959, Ser. No. 839,990
4 Claims. (Cl. 260—465)

This invention relates to bis(cyanoalkyl) phenylenedicarbamates as new compositions of matter, and to processes for their production.

The novel bis(cyanoalkyl) phenylenedicarbamates of this invention can be graphically depicted by the formula:

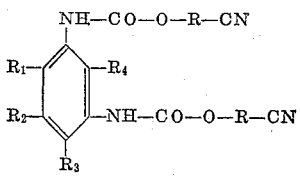

wherein R is a divalent saturated hydrocarbon radical containing from 1 to 10 carbon atoms, such as methylene, ethylene, propylene, isopropylene, decylene, cyclohexylene and the like, and $R_1$, $R_2$, $R_3$ and $R_4$ are members selected from the group consisting of hydrogen and lower alkyl radicals. By the term "lower alkyl" as used herein is meant an alkyl radical having from 1 to 6 carbon atoms, inclusively. Illustrative examples of the novel bis(cyanoalkyl) phenylenedicarbamates of this invention include bis(2-cyanoethyl) 4-methyl-1,3-phenylenedicarbamate which can be represented by the formula:

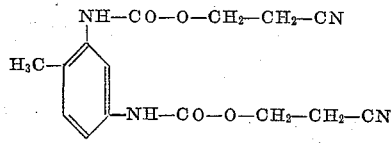

and such compounds as:

Bis(1-cyanoethyl) 4-methyl-1,3-phenylenedicarbamate
Bis(2-cyanoisopropyl) 4 - methyl - 1,3 - phenylenedicarbamate
Bis(2-cyanoethyl) 4-ethyl-1,3-phenylenedicarbamate
Bis(1-cyanoethyl) 5-isopropyl-1,3 - phenylenedicarbamate
Bis(1-cyanoethyl) 1,3-phenylenedicarbamate
Bis(1-cyanomethyl) 4-methyl-1,3-phenylenedicarbamate
Bis(1-cyanomethyl) 4-hexyl-1,3-phenylenedicarbamate
Bis(1-cyanomethyl) 1,3-phenylenedicarbamate
Bis(2-cyanocyclohexyl) 4 - methyl - 1,3 - phenylenedicarbamate
Bis(2-cyanocyclohexyl) 1,3-phenylenedicarbamate
Bis(cyanomethyl) 4,6-diisopropyl - 1,3 - phenylenedicarbamate
Bis(2-cyanodecyl) 4-methyl - 1,3 - phenylenedicarbamate
and the like.

The bis(cyanoalkyl) phenylenedicarbamates of this invention can be produced by the reaction of a phenylenediisocyanate compound with a cyanohydrin compound.

The phenylenediisocyanate compounds which can be employed as starting materials in preparing the novel compounds of this invention can be graphically depicted by the formula:

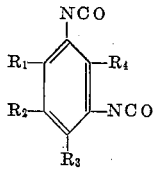

wherein $R_1$, $R_2$, $R_3$ and $R_4$ are as above defined. Illustrative of such starting materials is 4-methyl-1,3-phenylenediisocyanate which can be represented by the formula:

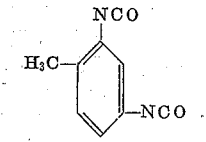

and such compounds as 4-ethyl-1,3-phenylenediisocyanate, 5-isopropyl - 1,3-phenylenediisocyanate, 1,3-phenylenediisocyanate, 4-hexyl-1,3-phenylenediisocyanate, 4,6-diisopropyl-1,3-phenylenediisocyanate, and the like.

The cyanohydrin compounds which can be employed as starting materials in preparing the novel compounds of this invention can be graphically depicted by the formula:

$$HO-R-CN$$

wherein R is as above defined. Illustrative of such starting materials is ethylene cyanohydrin which can be represented by the formula:

$$HO-CH_2-CH_2-CN$$

and acetone cyanohydrin which can be represented by the formula:

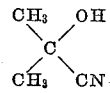

and such compounds as methylene cyanohydrin, 1,4-butylene cyanohydrin, 1,3-propylene cyanohydrin, 1,6-hexylene cyanohydrin, 1,2-cyclohexylene cyanohydrin, 1,10-decylene cyanohydrin, lactonitrile and the like.

The compounds which can be employed as starting materials in preparing the novel compounds of this invention are known materials and can be prepared in accordance with procedures customarily employed for preparing such compounds.

The process of the instant invention, which comprises reacting a phenylenediisocyanate compound with a cyanohydrin compound, can be illustrated by the following graphic equation:

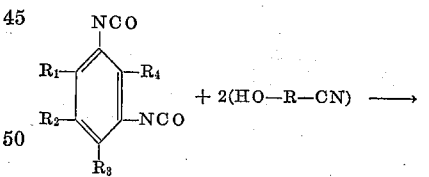

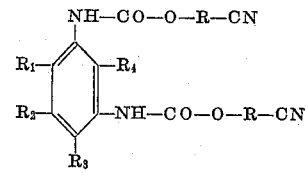

wherein R, $R_1$, $R_2$, $R_3$ and $R_4$ are as above defined. Thus, for example, bis(2-cyanoethyl) 4-methyl-1,3-phenylenedicarbamate can be prepared by the reaction of 4-methyl-1,3-phenylenediisocyanate with ethylene cyanohydrin, and bis(2-cyanoisopropyl-2-yl) 4-methyl-1,3 - phenylenedicarbamate can be prepared by the reaction of 4-methyl-1,3-phenylenediisocyanate with acetone cyanohydrin.

When effecting reaction according to the process of the instant invention, it is preferable to employ an excess of cyanohydrin compound over the stoichiometric amount required to react with the phenylenediisocyanate compound present in order to ensure complete conversion of the phenylenediisocyanate compound. Amounts of cyanohydrin compound ranging from the stoichiometric equivalent to a 3:1 mole ratio are preferred for this purpose, but amounts of from as little as 1 mole to as much as 20 moles per mole of phenylenediisocyanate compound present can also be employed.

Reaction between a phenylenediisocyanate compound and a cyanohydrin compound according to the process of the instant invention is promoted by and preferably effected in the presence of a catalyst. Specific examples of the catalysts which can be employed include tertiary amines such as pyridine, trimethylamine, triethylamine, tri-n-propylamine, triisopropylamine, tributylamine, methyldiethylamine, dimethylethylamine, benzyldimethylamine, benzyldiethylamine, ethylenediamine and the like, dialkyltin oxides such as dibutyltin oxide, diisopropyltin oxide, dioctyltin oxide and the like, and dialkyltin diacylates such as dibutyltin diacetate, dipropyltin dipropionate, dibutyltin benzoate and the like. The catalyst can be employed in an amount of from as low as 0.001 percent by weight to as high as 1 percent by weight, preferably from 0.01 percent by weight to 0.05 percent by weight, of the combined weight of reactants employed.

Reaction according to the process of the instant invention readily occurs at temperatures ranging from as low as 0° C. to as high as 150° C., but is preferably effected at temperatures ranging from about 20° C. to about 60° C.

Atmospheric pressure is usually employed in effecting reaction according to the process of the instant invention. However, pressure both above and below atmospheric pressure, for example pressures ranging from as low as 100 mm. Hg to as high as 1000 p.s.i., can also be employed whenever it is desirable to do so.

Reaction according to the process of the instant invention may be effected in an inert liquid solvent. By an inert liquid solvent is meant a liquid solvent in which the starting materials are soluble to an extent whereby they are brought into reactive contact and which itself is nonreactive under the conditions of the reaction. Suitable inert liquid solvents which can be employed include hydrocarbons such as hexane, cyclohexane, heptane, benzene, toluene and the like, and ethers such as dioxane, tetrahydrofuran and the like. In general, an amount of solvent ranging from 0 to 10 times, preferably from 0 to 2 times, the weight of reactants present can be effectively employed.

The novel bis(cyanoalkyl) phenylenedicarbamates of this invention are useful as soil fungicides and herbicides.

The following examples are set forth for purposes of illustration so that those skilled in the art may better understand this invention, and it should be understood that they are not to be construed as limiting this invention in any manner.

EXAMPLE I

*Preparation of Bis(2-Cyanoethyl) 4-Methyl-1,3-Phenylenedicarbamate*

An admixture of 87 grams of 4-methyl-1,3-phenylenediisocyanate (0.5 mole), 71 grams of ethylene cyanohydrin (1.0 mole), 0.5 ml. of pyridine, and 500 ml. of benzene was prepared and maintained at room temperature for 16 hours. The mixture was then filtered and the precipitate obtained thereby was crystallized from a mixture of acetonitrile and petroleum ether. About 155 grams of bis(2-cyanoethyl) 4-methyl-1,3-phenylenedicarbamate were recovered. This represented a yield of about 98 percent of theoretical. This compound had a melting point of 125–127° C. and was identified by its infrared absorption spectrum and chemical analysis.

*Analysis.*—Calculated for $C_{15}H_{16}N_4O_4$: C, 57.1%; H, 5.06%; N, 17.7%. Found: C, 58.1%; H, 4.91%; N, 16.3%.

EXAMPLE II

*Preparation of Bis(1-Cyanoethyl) 4-Methyl-1,3-Phenylenedicarbamate*

An admixture of 43.5 grams of 4-methyl-1,3-phenylenediisocyanate (0.25 mole), 36 grams of lactonitrile (0.5 mole), 0.2 gram of dibutyltin oxide, and 400 ml. of benzene was prepared and maintained at room temperature for 40 hours. The mixture was then filtered and the precipitate obtained thereby was slurred in about 200 ml. of diethyl ether and then separated therefrom by filtration. About 31 grams of bis(1-cyanoethyl) 4-methyl-1,3-phenylenedicarbamate were obtained in this manner. This represented a yield of about 39 percent of theoretical. This compound, which decomposed at a temperature of 115–130° C., was identified by its infrared absorption spectrum and chemical analysis.

*Analysis.*—Calculated for $C_{15}H_{16}N_4O_4$: C, 57.1%; H, 5.06%; N, 17.7%. Found: C, 58.5%; H, 5.5%; N, 18.1%.

EXAMPLE III

*Preparation of Bis(2-Cyanoisopropyl) 4-Methyl-1,3-Phenylenedicarbamate*

An admixture of 43.5 grams of 4-methyl-1,3-phenylenediisocyanate (0.25 mole), 43 grams of acetone cyanohydrin (0.5 mole), 0.2 gram of dibutyltin oxide, and 400 ml. of benzene was prepared and maintained at room temperature for 40 hours. The mixture was then filtered and the precipitate obtained thereby was washed with benzene. About 59 grams of bis(2-cyanoisoproyl) 4-methyl-1,3-phenylenedicarbamate was obtained in this manner. This represented a yield of about 69 percent of theoretical. This compound had a melting point of 125–127° C. and was identified by its infrared absorption spectrum and chemical analysis.

*Analysis.*—Calculated for $C_{17}H_{20}N_4O_4$: C, 59.5%; H, 5.81%; N, 16.27%. Found: C, 59.4%; H, 5.9%; N, 16.13%.

EXAMPLE IV

*Use of Bis(2-Cyanoisopropyl) 4-Methyl-1,3-Phenylenedicarbamate as a Soil Fungicide*

The test soil employed in this experiment was artificially infested with *Rhyzoctonia solani* (sore-shin of cotton) fungus. The soil was prepared by culturing the fungus on 40 grams of No. 1 Hard Red Winter Wheat suspended in 50 ml. of distilled water for about 15 days at 70° F., and then incorporating the fungus-infested wheat suspension into an amount of sterile soil equal to the volume of ten 4-inch pots by means of a cement mixer. The wheat employed in culturing the fungus was previously autoclaved with 50 ml. of distilled water in a 125 ml. Erlenmeyer flask for 30 minutes at 15 lb. pressure, and then shaken to form a loose mass.

Four 4-inch pots were filled with test soil prepared in accordance with the above procedure. After lightly watering the soil, the pots were stored in an incubation chamber maintained at a temperature of 65° F. and 100% relative humidity for 2 days. At the end of this time, 75 ml. of a test emulsion containing bis(2-cyanoisopropyl) 4-methyl-1,3-phenylenedicarbamate was added to each of two of the clay pots. The emulsion employed was prepared by dissolving 0.25 gram of the bis(2-cyanoisopropyl) 4-methyl-1,3-phenylenedicarbamate in 10 ml. of acetone, adding 0.025 ml. of Tergitol Nonionic NPX (an alkyl phenyl ether of polyethylene glycol, sold commercially by Union Carbide Corporation, New York, New York) as an emulsifier, and then diluting the mixture up to 100 ml. with water. A similar emulsion free from bis(2-cyanoisopropyl) 4-methyl-1,3-phenylenedicarbamate was added to the other two pots which are employed as controls.

The pots were incubated at room temperature for two days. At the end of this time, each pot was seeded with 15 seeds of "Coker 100" cotton seed and stored in the greenhouse. After 15 days had elapsed, the pots were examined and it was found that 70.89 percent of the seedlings in the pots that had been treated with the emulsion containing bis(2-cyanoisopropyl) 4-methyl-1,3-phenylenedicarbamate had germinated while only 0.24 percent of the seedlings in the control pots had germinated.

EXAMPLE V

*Use of Bis(2-Cyanoisopropyl) 4-Methyl-1,3-Phenylene-Dicarbamate as a Herbicide*

A mixture of 31 ml. of *Setaria italica* var. *stramineofructa* (Golden Millet) seeds, 12 ml. of *Amaranthus retroflexus* (Red Root) seeds, and 6100 ml. of sifted soil was prepared and rolled on a ball mill in a two-gallon container for approximately one-half hours (in order to insure uniform mixing of seeds and soil). Seventy (70) ml. of this mixture were then added to each of three 3-inch clay pots that had been previously filled with soil to about 1½ inches from their tops. After tamping the seed-soil mixture firmly, the pots were removed to a greenhouse and lightly watered. About two hours later, 25 ml. of a test emulsion containing bis(2-cyanoisopropyl) 4-methyl-1,3-phenylenedicarbamate was added to each of two of the clay pots. The emulsion employed was prepared by dissolving 0.25 gram of the bis(2-cyanoisopropyl) 4-methyl-1,3-phenylenedicarbamate in 10 ml. of acetone, adding 0.025 ml. of Tergitol Nonionic NPX (an alkyl phenyl ether of polyethylene glycol, sold commercially by Union Carbide Corporation, New York, New York) as an emulsifier, and then diluting the mixture up to 100 ml. with water. A similar emulsion free from bis(2-cyanoisopropyl)-4-methyl-1,3-phenylenedicarbamate was addeed to the third pot which was employed as a control.

The pots were stored in a greenhouse and lightly watered for three weeks. At the end of this time, the pots were examined and it was found that the *Setaria italica* var. *stramineofructa* and *Amaranthus retroflexus* species that had been treated with bis(2-cyanoisopropyl) 4-methyl-1,3-phenylenedicarbamate were stunted and/or reduced in stand as compared to the species in the control pot.

Unless otherwise specified, all parts and percentages, as used throughout this specification, are by weight.

What is claimed is:

1. The bis(cyanoalkyl) phenylenedicarbamates represented by the general formula:

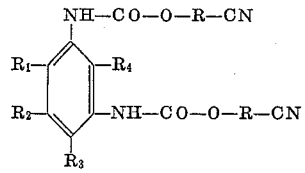

wherein R is a divalent saturated hydrocarbon radical containing from 1 to 10 carbon atoms, and $R_1$, $R_2$, $R_3$ and $R_4$ are members selected from the group consisting of hydrogen and lower alkyl radicals.

2. Bis(2 - cyanoethyl) 4 - methyl - 1,3 - phenylenedicarbamate.

3. Bis(1 - cyanoethyl) 4 - methyl - 1,3 - phenylenedicarbamate.

4. Bis(2 - cyanoisopropyl) 4 - methyl - 1,3 - phenylenedicarbamate.

References Cited in the file of this patent

UNITED STATES PATENTS

| | | |
|---|---|---|
| 2,789,128 | Tursich | Apr. 16, 1957 |
| 2,789,129 | Bissinger | Apr. 16, 1957 |
| 2,798,885 | Ensslin et al. | July 9, 1957 |

OTHER REFERENCES

Saunders et al.: Chem. Revs. 43, 209–210 (1948).

Migrdichion, "The Chemistry of Organic Cyanogen Compounds," 1947, page 383.